United States Patent
Kim et al.

(10) Patent No.: US 12,516,239 B2
(45) Date of Patent: Jan. 6, 2026

(54) METHOD FOR COATING A QUANTUM DOT USING DROPLET EVAPORATION IN CONFINED SYSTEM

(71) Applicant: KOREA ADVANCED INSTITUTE OF SCIENCE AND TECHNOLOGY, Daejeon (KR)

(72) Inventors: Hyoungsoo Kim, Daejeon (KR); Jeongsu Pyeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 946 days.

(21) Appl. No.: 17/694,364

(22) Filed: Mar. 14, 2022

(65) Prior Publication Data
US 2022/0306933 A1    Sep. 29, 2022

(30) Foreign Application Priority Data
Mar. 24, 2021    (KR) .................. 10-2021-0037776

(51) Int. Cl.
| | |
|---|---|
| *C09K 11/02* | (2006.01) |
| *B82Y 20/00* | (2011.01) |
| *B82Y 40/00* | (2011.01) |

(52) U.S. Cl.
CPC ............. *C09K 11/02* (2013.01); *B82Y 20/00* (2013.01); *B82Y 40/00* (2013.01)

(58) Field of Classification Search
CPC ................................................. C09K 11/02
See application file for complete search history.

(56) References Cited

U.S. PATENT DOCUMENTS

| | | | | |
|---|---|---|---|---|
| 2016/0355405 | A1* | 12/2016 | Yoon ............... | C09K 19/12 |
| 2017/0346008 | A1* | 11/2017 | Xu .................. | H10K 71/13 |

FOREIGN PATENT DOCUMENTS

| | | | |
|---|---|---|---|
| CN | 107936699 A | * | 4/2018 |
| KR | 10-2016-0074157 A1 | | 3/2018 |
| KR | 10-1945514 B1 | | 2/2019 |
| KR | 10-2173141 B1 | | 11/2020 |

OTHER PUBLICATIONS

Yang, High-Resolution Inkjet Printing of Quantum Dog Light-Emitting Microdiode Arrays, Advanced Optical Materials, vol. 8, Issue 1, Jan. 3, 2020, p. 1-7 (Year: 2020).*
Pyeon, Jeongsu and Kim, Hyoungsoo, "Evaporation of multi-component liquid droplets in a confined geometry," Abstract for 11th National Congress on Fluids Engineering, presented on Aug. 13, 2020 (conference pamphlet attached).

* cited by examiner

*Primary Examiner* — Tabatha L Penny
(74) *Attorney, Agent, or Firm* — MEDLER FERRO WOODHOUSE & MILLS PLLC

(57) ABSTRACT

The present invention relates to a method for coating quantum dots onto a substrate in a confined system comprising an upper open space and a bottom surface comprising the substrate, the method comprising, the method comprising: depositing a droplet comprising the quantum dots to the bottom surface; and sealing the upper open space with tape or a self-sealing material selected from paraffin or latex to form a sealed confined system, wherein the deposited droplet is evaporated in the sealed confined system, thereby coating the quantum dots onto the substrate.

12 Claims, 6 Drawing Sheets

METHOD FOR COATING A QUANTUM DOT USING DROPLET EVAPORATION IN CONFINED SYSTEM

CROSS REFERENCE TO RELATED APPLICATIONS

This application claims the priority benefit of Korean Patent Application No. 10-2021-0037776 filed on Mar. 24, 2021, the entirety of which is incorporated by reference herein.

BACKGROUND OF THE INVENTION

1. Field of the Invention

The present invention relates to a quantum dot coating method, and more particularly, to a method for coating a quantum dot using droplet evaporation in a confined system, which is capable of uniformly coating the quantum dots.

2. Prior Art

Quantum dots refer to semiconductor nanoparticles whose electrical and optical properties are largely changed when the size of a material is decreased to nanometers. In the early 1980s, professor Louis Bruce of Columbia University, who was a researcher at Bell Labs in the United States at the time, published research regarding a small semiconductor crystal in the Journal of Chemistry and Physics. Thereafter, the semiconductor crystal was called a quantum dot by professor Mark Reed of Yale University. The quantum dot has been developed as a next-generation light emitting device because they can emit various colors by generating light wavelengths having different lengths for each particle size without changing the type of material, and have advantages such as high color purity, photostability, and the like compared to the existing light emitting bodies.

In addition, since the quantum dot is a chemically synthesized inorganic material, it is cheaper and has a longer life-span than organic light emitting diodes (OLEDs) based on organic materials. The quantum dot has more than 10% higher color reproducibility than OLED, such that it is possible to compensate for disadvantages of LCDs.

However, the quantum dots easily undergo an oxidation reaction in a high temperature and high humidity environment, such that intrinsic luminescence properties thereof are easily lost. For that reason, vacuum thermal evaporation (VTE) under high temperature-vacuum conditions applied to organic light emitting diodes (OLEDs) is not suitable to manufacture quantum dots. Therefore, quantum dot patterns are produced using methods such as photoresist (PR), nanoimprint lithography (NIL) and the like. However, since the photoresist (PR) process also requires a baking process to apply heat, it is necessary to develop heat-resistant quantum dots, which results in a reduction of cost competitiveness. In the case of nanoimprint lithography (NIL), since a pressing and curing process is required for the quantum dot pattern, physical damage to the quantum dot itself may occur. In addition, since quantum dots are not uniformly coated by using conventional coating methods, there are problems in that a separate additive should be included in the ink used for coating, or separate pressing fixation should be additionally performed.

PRIOR ART DOCUMENT

Patent Document (Patent Document 0001) Korean Patent Registration Publication No. 10-1945514
(Patent Document 0001) Korean Patent Registration Publication No. 10-2173141

SUMMARY OF THE INVENTION

In order to solve the above-described problems, it is an object of the present invention to provide a method for coating a quantum dot using droplet evaporation in a confined system, which is capable of uniformly coating quantum dots even at room temperature or low temperature.

To achieve the above object, the present invention provides a method for coating a quantum dot using droplet evaporation in a confined system.

In the confined system, when a droplet of a mixture of multi-components has a size of radius R, a phenomenon in which particles floating in the droplet gather near the center occurs. A radius of a region having the smallest area without any particle escaping to an outside from a contact line of the droplet during gathering the particles is defined as a critical radius ($r_p$) (see FIG. 1).

In the present invention, if the size of the confined system is defined as a hydraulic radius L thereof, that is, a distance between the confined systems based on centers of droplets, and the radius of the droplet is defined as R, a ratio between the size of the confined system and the relative size of the droplet is referred to as a geometric ratio (L−R)/R based on the relationship therebetween.

The geometric ratio (L−R)/R to the size of a confined space in the present invention is not limited, but it is preferable to have a value of 1.0 to 1.5. For example, when a component of the mixture in the droplet is ethanol, it is preferable that the geometric ratio is 1.3.

When the geometric ratio (L−R)/R to the size of the confined space exceeds the above range, a confinement effect is decreased and the droplets are deposited at an edge, thereby resulting in a phenomenon of multiple coffee rings, and when the ratio is less than the above range, a concentration of volatile vapor stagnating around the droplet reaches saturation within a short period of time due to the gravitational effect, such that the confinement effect does not clearly appear.

A geometric initial height ho of the droplet in the present invention is not limited, but in order to optimize the confinement effect, it is preferable that the droplet has a geometric initial height ho of 0.37±0.01 mm. The initial height ho of the droplet refers to a height of the droplet immediately after adding dropwise the target droplet onto a substrate.

When the geometric initial height ho of the droplet is less than the above range, the stagnated volatile vapor covers the entire droplet within a short period of time, such that the Marangoni flow in a center direction of the droplet caused by the confinement effect is rapidly dissipated. On the other hand, when the height thereof exceeds the above range, the volatile vapor does not sufficiently cover the entire droplet, such that the confinement effect is relatively reduced.

During when the multi-component droplets evaporate, sealing the confined system is key in the method for coating a quantum dot according to the present invention. The droplets may be supplied to the confined system to be deposited on a bottom surface thereof, and an upper open space may be sealed with tape or other sealable materials. In addition, the confined system may use a system made of self-sealable materials such as paraffin or latex in advance, but it is not limited to a specific example. Further, the confined system (or space) may be sealed, regardless of before or after the supply of the droplets.

In the present invention, the droplet may be a mixture of two or more solvents. One of the mixed solvents may be a volatile solvent, and it is preferable that the volatile solvent should have a molar molecular weight greater than 28.93 g/mol, which is a molar molecular weight of air.

In addition, since vapor pressures or volatilities between the mixed solvents are different from each other, a relative evaporation rate thereof should be greater than 1, and a difference in the surface tension should occur.

The reason is that it is possible to maximize the Marangoni effect caused by the difference in the surface tension between solvents including a plurality of solvents by generating a continuous and local difference in the surface tension on the surface of the droplets during evaporation.

As an example, since a vapor pressure (5.95 kPa) of ethanol as the volatile solvent is greater than a vapor pressure (2.34 kPa) of water, the relative evaporation rate of the solvent consisting of ethanol and water is greater than 1.

In one embodiment of the present invention, when mixing water, which is a general solvent, with other highly volatile solvents, the vapor pressure of the solvent should be greater than 2.34 kPa, which is the vapor pressure of water based on room temperature.

In one embodiment of the present invention, one of the two or more solvents may be the volatile solvent. Specific examples of a combination of two or more solvents may include 1,2-dichlorobenzene and phenylcyclohexane, 1,2-dichlorobenzene and toluene, octane or hexane and phenylcyclohexane, water and ethanol, water and methanol, water and 1,4-dioxane, and water, ethanol and 1,4-dioxane. Types of the solvents are not limited as long as they are solvent combinations that can meet the conditions proposed in the present invention.

At this time, the volatile solvent that can be considered together is not limited, and may include at least one selected from acetaldehyde, acetylene, acetylenedichloride, acrylonitrile, 1,3-butadiene, butane, chloroform, chlorobenzene, cyclohexane, 1,2-dichloroethane, 1,2-dichlorobenzene, phenylcyclohexane, diethylamine, ethylene, methylene chloride, formaldehyde, hexane, heptane, octane, hexadecane, undecane, decane, dodecane, xylene, toluene, benzene, octadecane, tetradecane, butyl ether, ethanol, methanol, isopropyl alcohol, propylene, propylene oxide, trichloroethane, ethylbenzene, and 1,4-dioxane.

In the present invention, the evaporation may be performed at room temperature or a boiling point or less of the volatile solvent, but it is not limited thereto. The room temperature is an average temperature throughout the year, and although not strictly defined, generally means a range of 20±5° C.

In the method for coating a quantum dot according to the present invention, an evaluation on the formation of the quantum dot pattern may be represented by a coating uniformity $I_{edge}/I_{center}$. In this case, $I_{edge}$ means a deposition intensity of the quantum dots at the edge of the droplet, and $I_{center}$ means a deposition intensity of the quantum dots at the center of the droplet. The value of the uniformity $I_{edge}/I_{center}$ is preferably ≅1 to 1.5. It means that as the topology uniformity is close to 1, the quantum dots are uniformly coated.

In one embodiment of the present invention, the method for coating a quantum dot using droplet evaporation in a confined system includes:

(a) inputting quantum dots into a mixed solution;

(b) supplying droplets;

(c) evaporating the supplied droplets in the confined system.

The step (a) is a step of inputting quantum dots into a solution obtained by mixing two or more solvents including a volatile solvent.

In the preferred embodiment, the quantum dot may be a water-soluble quantum dot, but it is not limited thereto. In the case of a fat-soluble quantum dot, if a suitable organic solvent with high solubility is used, it may be applied to the present invention.

In addition, the quantum dot includes nanocrystals, nanoparticles, nanorods, nano-sized particles, quantum rods and the like.

The step (b) is a step of supplying the droplets by spraying them using inkjet printing nozzles.

The step (c) is a step of evaporating the sprayed droplets, and an upper portion of the system defining a space where the droplets are sprayed may be made of a self-sealable material such as paraffin or latex. As long as it is a method capable of providing a closed space during evaporation, it is not limited to a specific example. In addition, the sealing of the upper portion may be performed regardless of before or after the supply of the droplets.

The evaporation may be performed at room temperature or a boiling point or less of the volatile solvent, but it is not limited thereto. The room temperature is an average temperature throughout the year, and although not strictly defined, generally means a range of 20±5° C.

In the method for coating a quantum dot according to the present invention, it is possible to prevent the volatile vapor from being diffused to an external atmosphere by confining the quantum dots using only the confined system without performing separate chemical-physical treatment. At the same time, by generating a continuous and local difference in the surface tension on the surface of the droplets using the volatile vapor which is stagnated around the droplet due to a difference in density between the volatile vapor and air, it is possible to maximize the Marangoni effect caused by the difference in the surface tension between two solvents including the volatile solvent, and consequently, provide a uniform quantum dot coating pattern.

The present invention relates to a method for coating a quantum dot using droplet evaporation in a confined system, and may provide a new method capable of easily coating the quantum dots by maximizing the continuous Marangoni effect which occurs through the multi-component droplet evaporation phenomenon in the confined system without separate chemical-physical treatment.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating the relationship between a critical radius $r_p$ and a radius R of a droplet in the present invention;

FIG. 2 shows a geometry of a confined space, which is a diagram schematically illustrating the correlation between a hydraulic radius L a confined system defining the confined space and the radius R of a droplet;

FIG. 3 is diagrams illustrating a process of capturing flow patterns of droplets in Experimental Example 1 and a confined system according to the present invention;

DETAILED DESCRIPTION OF THE INVENTION

Hereinafter, the present invention will be described in detail by way of examples and experimental examples.

However, the following examples and experimental examples are only given for illustrating the present invention, and the content and scope of the present invention are not limited to the following examples and experimental examples.

Examples 1 to 4. Preparation of Quantum Dot Aqueous Solution

Droplets for coating quantum dots were prepared by the following method. Solutions were prepared by using ethanol in Examples 1 and 2, methanol in Example 3, and ethanol and 1,4-dioxane in Example 4 as a volatile solvent, respectively. As another solvent, distilled water was equally used to prepare solutions as listed in Table 1 below. 0.2 wt % of water-soluble quantum dot was added to the solutions prepared as described above, respectively, to finally prepare quantum dot aqueous solutions.

TABLE 1

|  | Volatile solvent (vol. %) | Another solvent (vol. %) |
| --- | --- | --- |
| Example 1 | Ethanol (50) | Distilled water (50) |
| Example 2 | Ethanol (70) | Distilled water (30) |
| Example 3 | Ethanol (70) | Distilled water (30) |
| Example 4 | Ethanol (33.33), 1,4-Dioxane (33.33) | Distilled water (33.33) |

Comparative Example 1. Preparation of Quantum Dot Aqueous Solution

A quantum dot aqueous solution was prepared according to the same procedures as described in Example 1, except that only distilled water was used as the solvent.

Experimental Example 1. Evaluation of Flow Patterns of Droplets Over Time in an Open System and a Confined System According to the Present Invention In order to evaluate droplet distribution patterns in the confined system according to the present invention, an experiment was performed as follows using the aqueous solution of Example 2. After adding 1.9 μm of fluorescent particles to the aqueous solution, the flow patterns were compared in the open system and in the confined system according to the present invention using particle image velocimetry.

Figure 1:
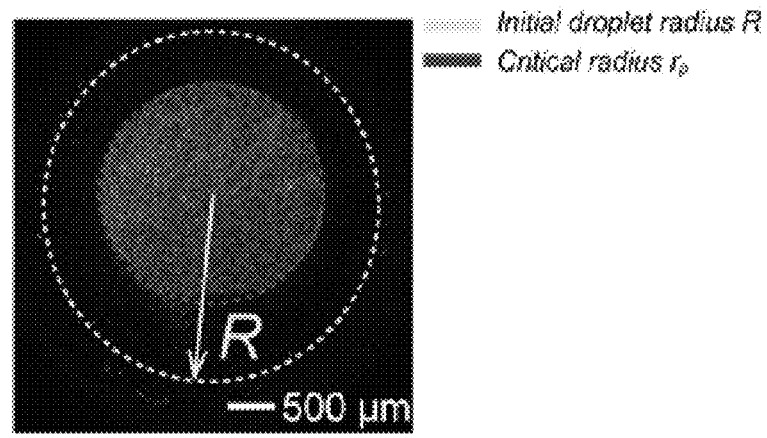
Figure 2:
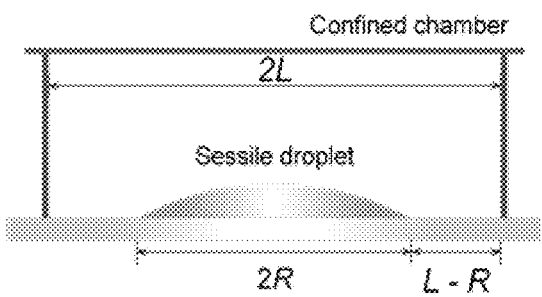
Figure 3:
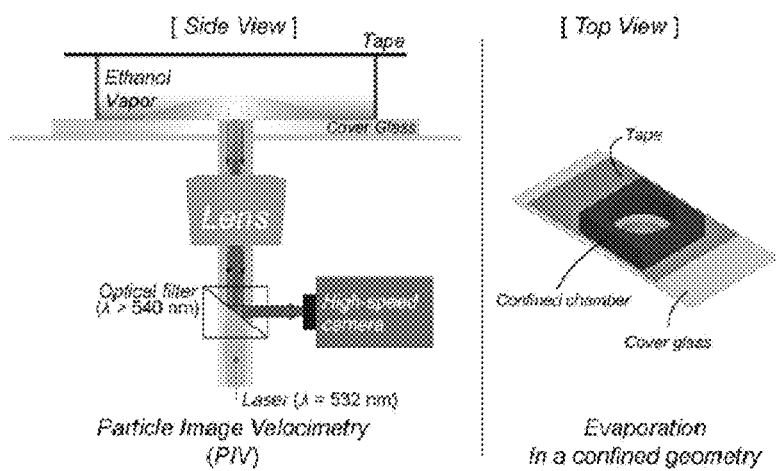

A process of capturing the flow patterns of the droplets and the confined system according to the present invention in the present experimental example are shown in FIG. 3. A confined system was fabricated using 3D printing, then droplets were dropped therein, and an upper open space defined in an upper portion of the system was sealed by taping. Herein, the upper portion of the system may be made of a self-sealing material such as paraffin or latex. As long as it is a method capable of providing the sealed space during evaporation, it is not limited to a specific example.

Figure 4:
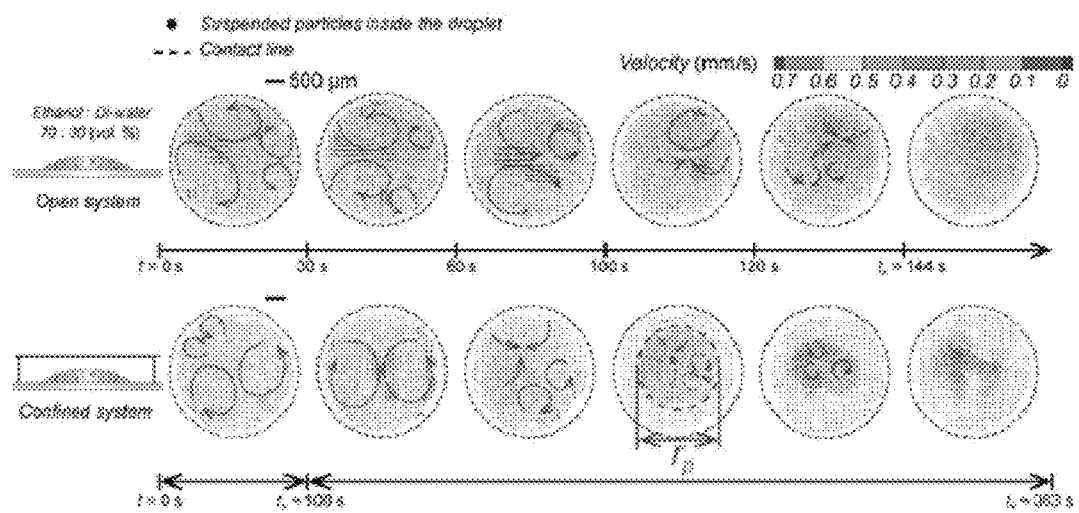
FIG. 4 is diagrams illustrating flow pattern and deposition results of droplets over time in an open system and the confined system according to the present invention in Experimental Example 1.

As a result of the experiment, it can be seen that an internal flow in the closed system exhibits similarly a complex mixed flow up to about 100 seconds before the initial evaporation compared to the open system, but after 100 seconds, a flow toward a center of the droplet occurs for a long time, such that the floating fluorescent particles are deposited in the center of the droplet (FIG. 4).

Figure 5:
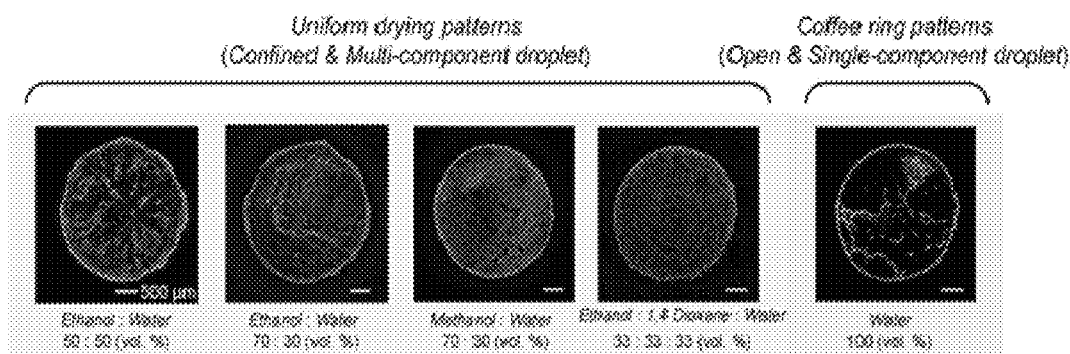
FIG. 5 is diagrams illustrating evaluation of deposition patterns of the droplets depending on the use of volatile solvents and the presence or absence of the confined system in Experimental Example 2.

Experimental Example 2. Evaluation of Deposition Patterns of the Droplets Depending on Mixing of the Volatile Solvent and Whether or not the Use of the Confined System According to the Present Invention The deposition patterns of the droplets depending on the present invention was evaluated using the aqueous solutions of Examples 1 to 4 and Comparative Example 1, and results thereof are shown in FIG. 5. The aqueous solutions of Examples 1 to 4 were subjected to evaporation at room temperature in the confined system, and the aqueous solution of Comparative Example 1 was evaporated at room temperature in the open system without the volatile solvent.

As a result of the experiment, in the case of Comparative Example 1, in which the aqueous solution was evaporated in the open system without containing the volatile solvent, a so-called coffee ring effect in which particles were deposited to the outermost portion of the droplet was exhibited.

Meanwhile, it can be seen that, in the case of Examples 1 to 3 according to the present invention, the particles were uniformly deposited.

Figure 6:
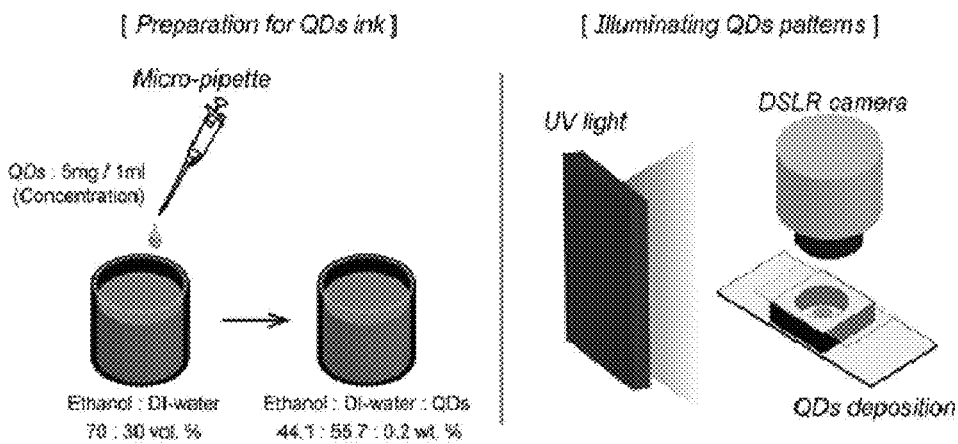
FIG. 6 is diagrams illustrating a process for evaluating the deposition patterns of the droplets in the open system of Experimental Example 3 and the confined system according to the present invention.
Figure 7:
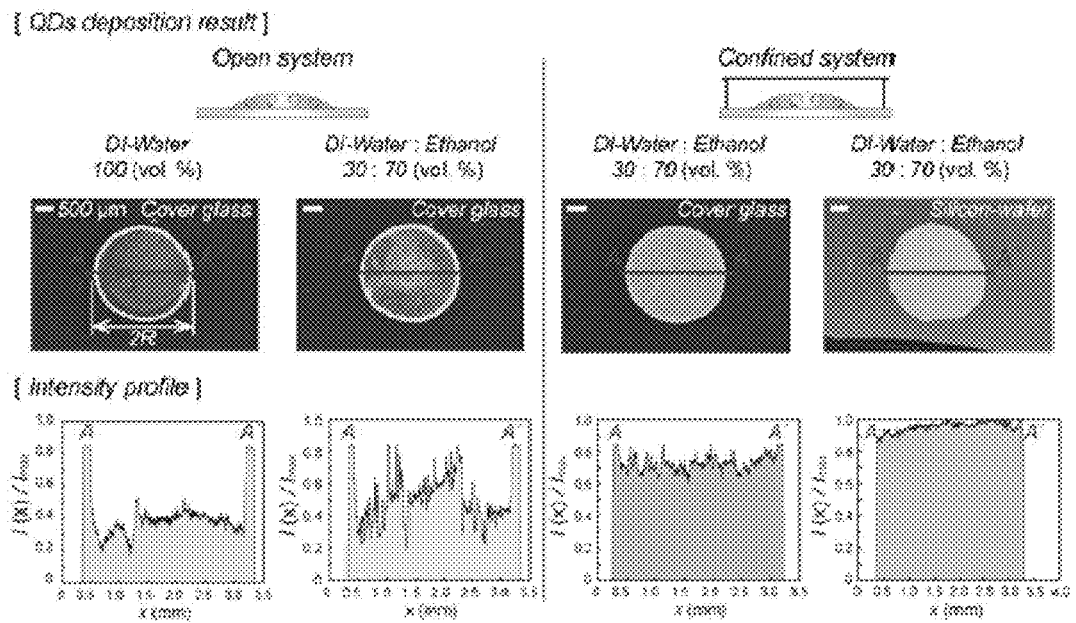
FIG. 7 is diagrams illustrating the evaluation results of deposition patterns of the droplets in the open system and the confined system according to the present invention in Experimental Example 3.

Experimental Example 3. Evaluation of Deposition Patterns of the Droplets Depending on Difference in Type of the System and Whether or not the Use in a Mixture of Volatile Solvent In order to evaluate the deposition patterns of the droplets depending on the difference in the type of the system and whether or not the use in a mixture of the volatile solvent, an experiment was performed using the aqueous solution of Example 2 and the aqueous solution of Comparative Example 1 as follows. The experimental method is shown in FIG. 6, and the experimental results are shown in FIG. 7. The solutions corresponding to Comparative Examples 1 and 2 were evaporated at room temperature in the open system, and the solution corresponding to Example 2 was evaporated at room temperature in the confined system. Then, the deposit patterns of the quantum dots were examined using a UV light source and luminescence uniformity was evaluated. A cover glass and a silicon wafer were used as a substrate for coating the droplets.

As a result of the experiment, in the open system, it can be seen that a smaller coffee ring effect occurs in Example 2 in which ethanol and distilled water are mixed than in Comparative Example 1 in which only distilled water is included, but the coffee ring pattern is still clearly seen.

On the other hand, in the confined system, it can be confirmed that the coffee ring effect hardly appeared regardless of the type of substrate, and the particles are uniformly distributed.

Example 5. Preparation of Quantum Dot Aqueous Solution

A quantum dot aqueous solution was prepared by including 34.4% by weight ('wt. %') of ethanol, 65.2 wt. % of distilled water, and 0.3 wt. % of water-soluble quantum dots.

Figure 8:
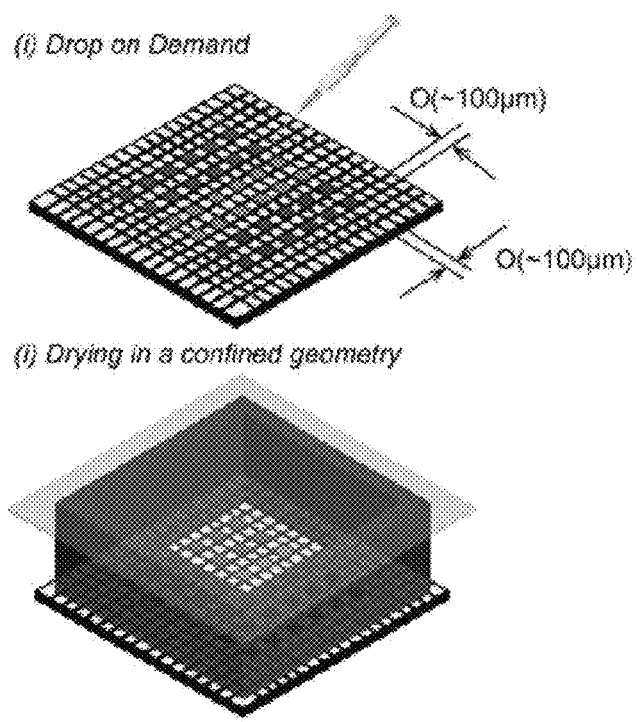
FIG. 8 is diagrams illustrating a process for evaluating the deposition patterns of the droplets in the open system and the confined system according to the present invention in Experimental Example 4.

Experimental Example 4. Evaluation of Deposition Patterns of the Droplets on Microscale The deposition patterns of the droplets on the microscale was evaluated as the following method using the quantum dot aqueous solution of Example 5. The quantum dot aqueous solution of Example 5 was added dropwise onto a PET transparent film on which a 500 μm square grid was formed by UV printing. Thereafter, the confined system fabricated by 3D printing was covered and taped, followed by drying the same (FIG. 8). The open system was not covered unlike the confined system, and the quantum dot aqueous solution was added dropwise thereto, followed by drying the same.

Figure 9:
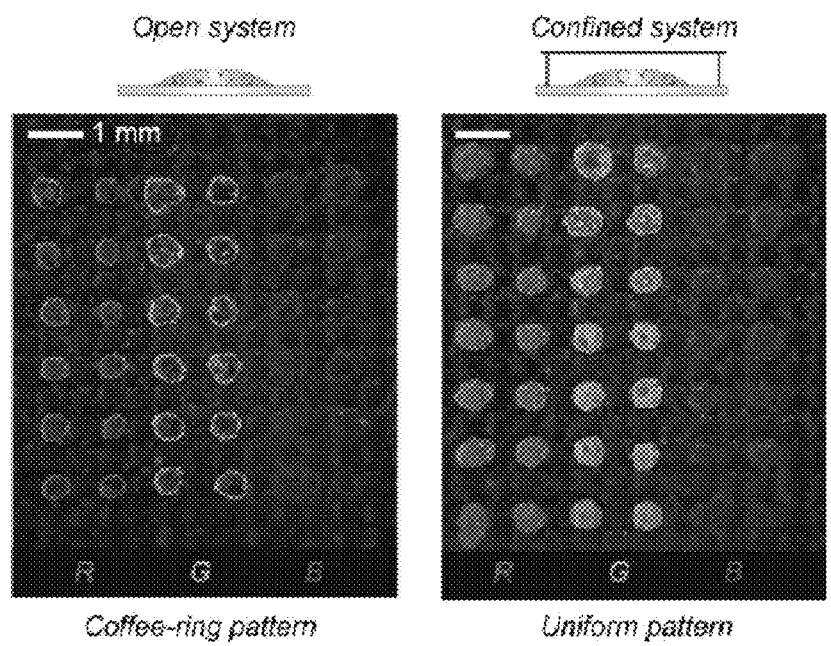
FIG. 9 is diagrams illustrating the evaluation results of the deposition patterns of the droplets in the open system and the confined system according to the present invention in Experimental Example 4.

As a result of the experiment, it can be seen that the coffee ring effect occurred at the edge of the droplet added dropwise in the open system. On the other hand, in the closed system according to the present invention, it can be seen that the color of the pattern was relatively clear, the coffee ring effect did not appear at the edge of the droplet, and the quantum dots were uniformly coated (FIG. 9).

Experimental Example 5. Evaluation of Flow in Droplets Having Various Shapes in the Confined System In order to evaluate the possibility of patterning of droplets having various shapes in the confined system according to the present invention, the flow was observed and compared using the droplets of Example 1 and Comparative Example 1 having triangular, square, and hexagonal shapes other than circular shape, and an experiment was performed according to the same procedures as described in Experimental Example 1. The experimental procedure is shown in FIG. 3.

Figure 11:
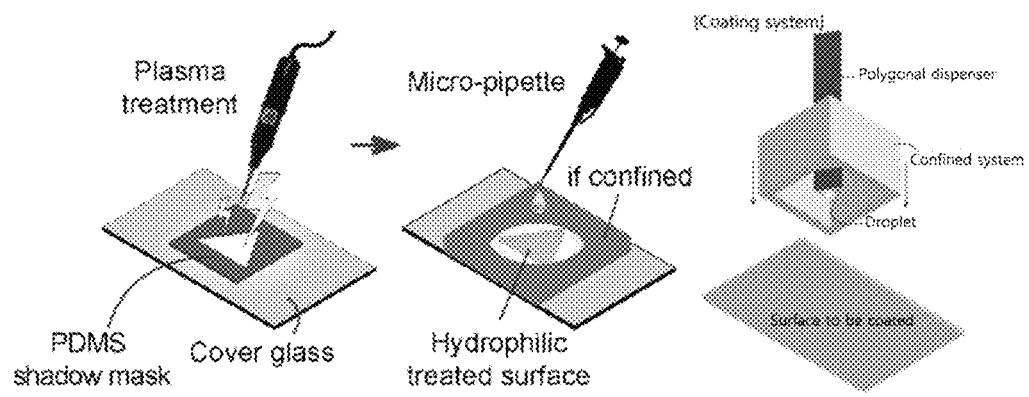
FIG. 11 is a view illustrating the experimental procedure of Experimental Example 6.

At this time, in order to generate polygonal droplets, quantum dot droplets were selectively added dropwise to a polydimethylsiloxane (PDMS) shadow mask on the coated substrate through plasma treatment. In addition, polygonal droplets may be generated by discharging the quantum dot droplets through dispensers (respectively having triangular, square, and hexagonal shapes) having polygonal-shaped holes (FIG. 11).

Figure 10:
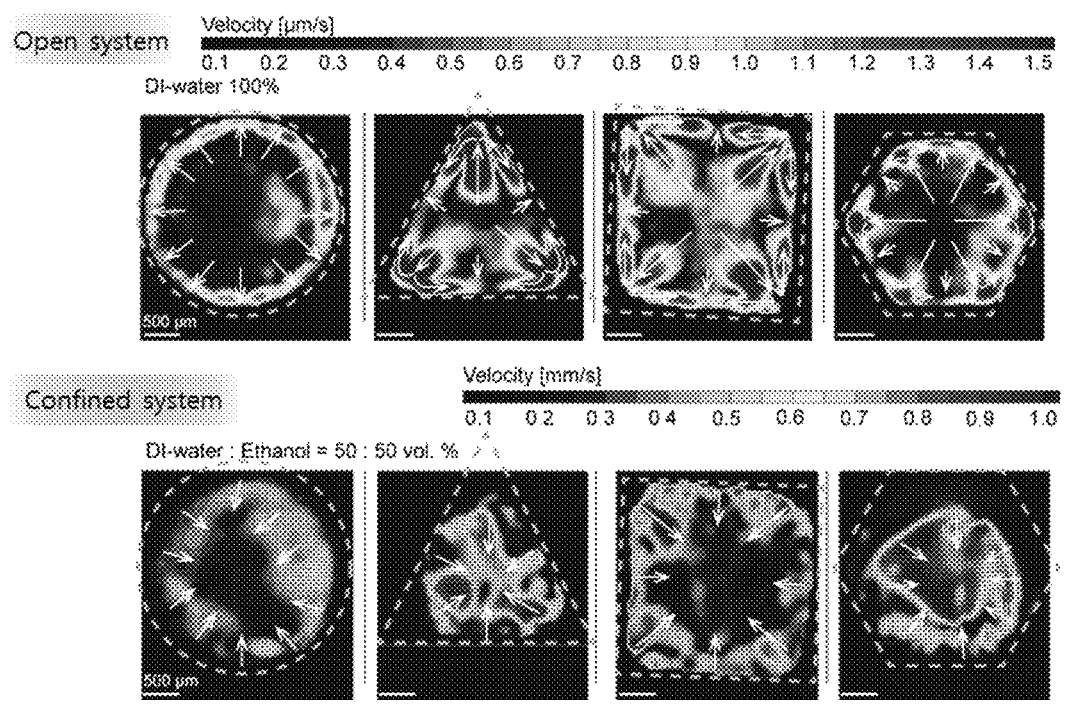
FIG. 10 is diagrams illustrating flow pattern results of droplets in the open system and the confined system according to the present invention in Experimental Example 5.

As a result of the experiment, in the open system, the droplet of Comparative Example 1 having a polygonal shape had a stronger coffee ring effect occurred therein than that of the existing ones due to the vertex structure having a relatively large radius of curvature. However, in the evaporation in the confined system according to the present invention, it can be seen that the flow in the center direction of the droplet occurs regardless of the shape of the droplet of Example 1 and the presence or absence of the vertex structure (FIG. 10).

Experimental Example 6. Evaluation of Patterning of Droplets Having Various Shapes in the Confined System In order to evaluate the patterning of droplets having various shapes in the confined system according to the present invention, an experiment was performed using the droplet of Example 1. Herein, in order to generate quantum dot droplets having a polygonal shape, the experiment was performed according to the same procedures as described in Experimental Example 3, and then quantum dots were emitted to evaluate pattern uniformity according to the same procedures as described in Experimental Example 5.

Figure 12:
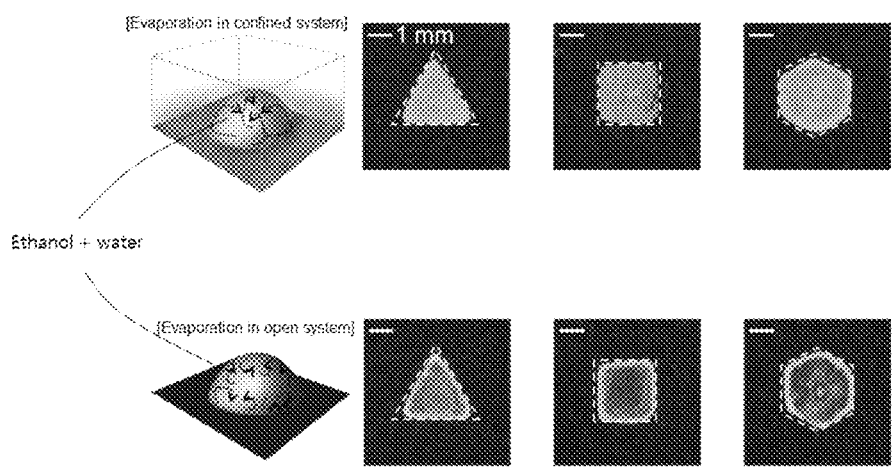
FIG. 12 diagrams illustrating coating results depending on the pattern shape of the droplets in the open system and the confined system according to the present invention in Experimental Example 6.

As a result of the experiment, it can be seen that, when the patterning was performed in the open system, the coffee ring effect occurred and a large number of quantum dots were deposited on the side face, whereas when the patterning was performed in the confined system, the coffee ring effect did not occur, and the quantum dots were uniformly coated regardless of the pattern shape (FIG. 12).

Experimental Example 7. Evaluation 2 of Patterning of Various Shapes in a Confined System In order to evaluate patterning of various shapes in the confined system according to the present invention, an experiment for evaluation was performed using the droplet of Example 1.

Specifically, a method of producing a quantum dot array pattern of a polygonal shape at 100 μm order level was conducted in such a way that a substrate subjected to hydrophobic surface treatment was prepared, a shadow mask having polygonal array pattern holes was placed on the substrate, and then the surface of the substrate exposed through the holes of the shadow mask was selectively subjected to hydrophilic modification treatment using UV-ozone treatment. Through such the hydrophilic modification treatment, a difference in the surface energy occurs between a portion covered with the mask and a portion not covered with the mask, such that the surface may have hydrophilic or hydrophobic properties.

Figure 13:
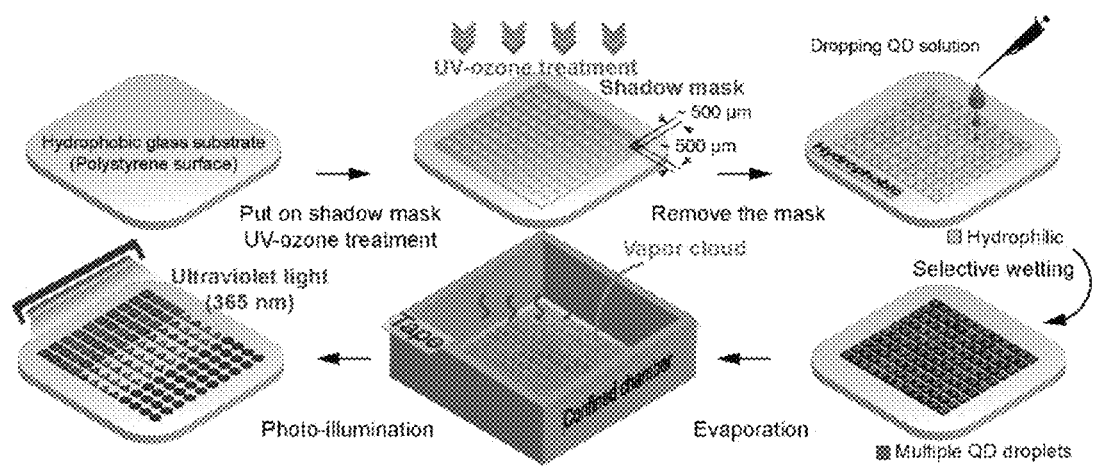
FIG. 13 is a diagram illustrating a process of generating a quantum dot multi-array pattern of a polygonal shape according to Experimental Example 7.
Figure 14:
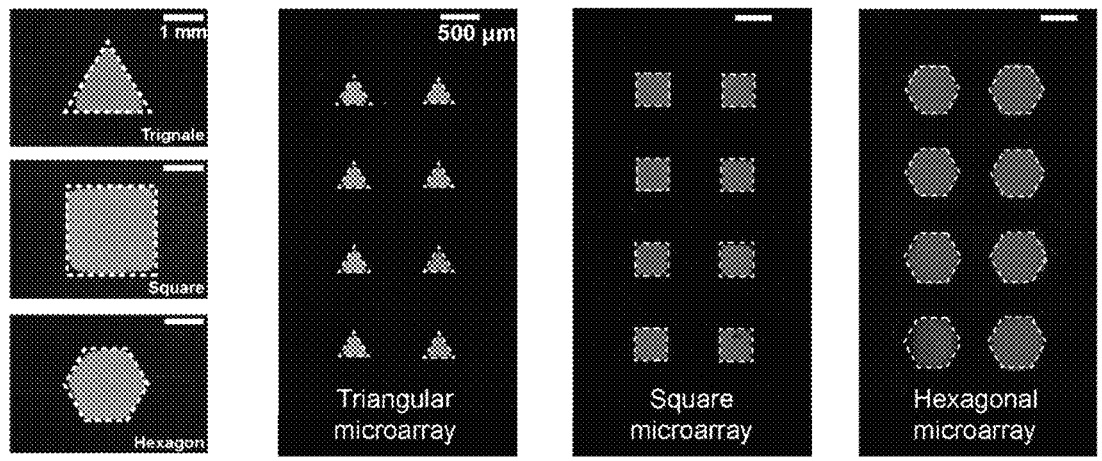
FIG. 14 is a diagram illustrating results of polygonal patterning of Experimental Example 7 as an image.

Thereafter, the quantum dot solution was dropped on the surface subjected to hydrophilic modification treatment to induce so that the quantum dot solution was gathered thereon, and the quantum dot array droplets were confined and evaporated at the same time using the confined system. In this case, the coffee ring effect was suppressed and uniform coating was simultaneously induced by the evaporation vapor (FIG. 13). The quantum dot array pattern was visualized using UV rays, and an image thereof is shown in FIG. 14.

As a result of the experiment, it was confirmed that the quantum dots coated according to the present invention were uniformly coated regardless of the pattern shape.

INDUSTRIAL APPLICABILITY

According to the present invention, oxidation reaction and physical damage due to a high temperature may not occur in quantum dots. Therefore, there is no need to consider factors of cost increase due to the development and application of quantum dots having heat resistance and pressure resistance properties. In addition, the consumption of quantum dots is small, which is efficient in terms of cost competitiveness, and the cleaning process scale and process steps may be effectively reduced in the present invention compared to the conventional processes. Further, since it is efficient in facility maintenance and management, and there is no limitation on the display area, the inventive coating method may be effectively applied to the omnidirectional display field to create unique added value, such that the present invention has very high industrial applicability.

What is claimed is:

1. A method for coating quantum dots onto a substrate in a confined system comprising an upper open space and a bottom surface comprising the substrate, the method comprising:
   depositing a droplet comprising the quantum dots to the bottom surface; and
   sealing the upper open space with tape or a self-sealing material selected from paraffin or latex to form a sealed confined system,
   wherein the deposited droplet is evaporated in the sealed confined system, thereby coating the quantum dots onto the substrate.

2. The method for coating quantum dots onto a substrate according to claim 1, wherein a geometric ratio (L–R)/R value of the confined system is 1 to 1.5,
   wherein L is a distance between a center of the deposited droplet and a side face of the confined system, and R is a radius of the droplet.

3. The method for coating quantum dots onto a substrate according to claim 1, wherein the droplet has a geometric initial height ho of 0.37±0.01 mm.

4. The method for coating quantum dots onto a substrate according to claim 1, wherein the droplet comprises a mixture of two or more solvents, and
   wherein the solvents have different volatility, and a relative evaporation rate thereof is greater than 1.

5. The method for coating quantum dots onto a substrate according to claim 4, wherein a first solvent of the two or more solvents is a volatile solvent, and the volatile solvent has a higher vapor pressure than a second solvent of the two or more solvents.

6. The method for coating quantum dots onto a substrate according to claim 5, wherein the volatile solvent has a molar molecular weight greater than 28.93 g/mol.

7. The method for coating quantum dots onto a substrate according to claim 5, wherein when the second solvent is water, a vapor pressure of the volatile solvent is greater than 2.34 kPa.

8. The method for coating quantum dots onto a substrate according to claim 5, wherein a combination of the two or more solvents includes at least one selected from 1,2-dichlorobenzene and phenylcyclohexane; 1,2-dichlorobenzene and toluene; octane or hexane and phenylcyclohexane; water and ethanol; water and methanol; water and 1,4-dioxane; and water, ethanol and 1,4-dioxane.

9. The method for coating quantum dots onto a substrate according to claim 5, wherein the volatile solvent includes at least one selected from acetaldehyde; acetylene; acetylenedichloride; acrylonitrile; 1,3-butadiene; butane; chloroform; chlorobenzene; cyclohexane; 1,2-dichloroethane; 1,2-dichlorobenzene; phenylcyclohexane; diethylamine; ethylene; methylene chloride; formaldehyde; hexane; heptane; octane; hexadecane; undecane; decane; dodecane; xylene; toluene; benzene; octadecane; tetradecane; butyl ether; ethanol; methanol; isopropyl alcohol; propylene; propylene oxide; trichloroethane; ethylbenzene; and 1,4-dioxane.

10. The method for coating quantum dots onto a substrate according to claim 5, wherein the evaporation is performed at room temperature or a boiling point or less of the volatile solvent.

11. The method for coating quantum dots onto a substrate according to claim 1, wherein a ratio of a deposition intensity of the quantum dots at the edge of the droplet ($I_{edge}$) to a deposition intensity of the quantum dots at the center of the droplet ($I_{center}$) is ≅1 to 1.5.

12. The method for coating quantum dots onto a substrate according to claim 1, wherein the droplet is supplied from a mixed solution comprising the quantum dots.

* * * * *